United States Patent [19]

Matsumoto

[11] 4,241,712
[45] Dec. 30, 1980

[54] INDUCTION SYSTEM FOR AN INTERNAL COMBUSTION ENGINE

[75] Inventor: Hiromitsu Matsumoto, Hamamatsu, Japan

[73] Assignee: Yamaha Hatsukoki Kabushiki Kaisha, Iwata, Japan

[21] Appl. No.: 896,083

[22] Filed: Apr. 13, 1978

[30] Foreign Application Priority Data

Aug. 16, 1977 [JP] Japan .................................. 52-97469

[51] Int. Cl.³ ............................................. F02M 31/00
[52] U.S. Cl. .................................... 123/432; 123/548
[58] Field of Search ................. 123/103 R, 127, 75 B, 123/122 AB, 122 AC; 261/23 A, 65 R, 39 A

[56] References Cited

U.S. PATENT DOCUMENTS

| | | | |
|---|---|---|---|
| 2,395,264 | 2/1946 | Gardner | 261/23 A |
| 2,473,808 | 6/1949 | Mallory | 123/122 H |
| 3,543,736 | 12/1970 | Suzuki | 123/32 ST |
| 3,554,174 | 1/1971 | Clawson | 123/127 |
| 3,659,564 | 5/1972 | Suzuki | 123/127 |
| 4,002,704 | 1/1977 | Laprade | 261/23 A |
| 4,018,199 | 4/1977 | Furucz | 261/23 A |
| 4,064,850 | 12/1977 | Nakagawa | 123/127 |
| 4,151,820 | 5/1979 | Furucz | 123/127 |

FOREIGN PATENT DOCUMENTS 2617728 5/1977 Fed. Rep. of Germany ........ 261/23 A

Primary Examiner—Ronald H. Lazarus
Attorney, Agent, or Firm—Ernest A. Beutler

[57] ABSTRACT

Two embodiments of internal combustion engine induction systems that provide for more efficient operation at low speed and low temperature. The induction system in each embodiment comprise a relatively large main induction passage and a relatively small sub-induction passage, each of which discharges into the combustion chamber of the engine. A throttle valve arrangement is provided so that at low temperatures and low load substantially all of the intake charge is delivered to the combustion chamber through the relatively small sub-induction passage. In this way the intake charge is drawn into the chamber at a high velocity and, if desired, swirling pattern to increase turbulence in the combustion chamber. This has the effect of accelerating combustion and promoting rapid flame propagation so as to improve running under these conditions and also so as to improve fuel economy under these conditions. In each embodiment of the invention the intake to the sub-intake passage is disposed in such a location that it will receive a heated charge to further promote fuel vaporization during the induction cycle. In one embodiment of the invention the intake for the sub-intake passage is disposed so that it will receive ram air.

24 Claims, 4 Drawing Figures

4,241,712

INDUCTION SYSTEM FOR AN INTERNAL COMBUSTION ENGINE

BACKGROUND OF THE INVENTION

This invention relates to an induction system for an internal combustion engine and more particularly to an improved induction system that insures better low speed, low temperature running characteristics.

It is well known that it is desirable to promote a high degree of turbulence in the combustion chamber of an internal combustion engine immediately prior to ignition. Such turbulence has the effect of increasing flame propagation speed and, therefore, improving the smoothness and efficiency of the running of the engine. Arrangements have been proposed for increasing turbulence such as the use of shrouded intake ports for generating a swirl during induction or the use of large squish areas which promotes turbulence during the compression stroke. Each arrangement, however, has well known disadvantages. The use of shrouded ports has a tendency to significantly reduce the volumetric efficiency of the engine at high loads. The use of large squish areas, on the other hand, has the effect of increasing the emission of certain unwanted exhaust gas constituents, particularly unburned hydrocarbons.

To overcome the aforenoted defects it has been proposed to provide with an engine, in addition to the conventional main induction passage a relatively small subinduction passage through which the intake charge is delivered during light load and low speed running. This arrangement has the advantageous effect of not reducing volumetric efficiency and further increasing fuel economy and smoothness in engine running at low speeds as well as showing a significant improvement in low speed fuel economy. Several embodiments of engines of this type may be found in my application for United States Letters Patent entitled Control of Carburetor Supplied Induction System, Ser. No. 838,353, filed Sept. 30, 1977 and assigned to the assignee of this invention.

One reason why conventional intake systems provide poor low speed, low temperature running characteristics is the likelihood of fuel condensation on the inner surfaces of the induction passages. Such condensation results from the low velocities at which the charge passes through the induction passages during idle and low speed operation and from the temperature effects of the induction system, when the engine is cold. To overcome these effects, it has been common practice to run the engine richer than normal during low speed and low temperature operation. Obviously this has the effect of decreasing fuel economy and increasing the emission of unwanted exhaust gas constituents such as unburned hydrocarbons and carbon monoxide. The arrangement shown in my aforenoted United States patent application Ser. No. 838,353 reduces these effects by permitting operation at normal fuel air ratios even though the temperature is low and the engine speed is low. Even through the structure shown in that application is particularly useful in this regard, it has been found that is some circumstances the abrupt rate of change in flow through the various induction passages still causes some deviation in the air fuel ratio from that desired.

It is, therefore, a principal object of this invention to provide an improved induction system for low speed and low temperature operation.

It is another object of the invention to provide an induction system for an internal combustion engine that offers efficient induction and combustion under all operating conditions.

SUMMARY OF THE INVENTION

First feature of this invention is adapted to be embodied in an internal combustion engine having a variable volume chamber in which combustion occurs, a charge forming device for discharging fuel, a main intake passage served by the charge forming device and communicating with the chamber through a main intake port and a sub-intake passage also served by the charge forming device and communicating with the chamber through a sub-intake port. The sub-intake passage has an effective cross-sectional area at the sub-intake port substantially less than the effective cross-sectional area of the main intake port for causing a given mass flow charge through the sub-intake port to enter the chamber at a significantly greater velocity. In connection with this feature of the invention temperature responsive means are provided for controlling the ratio of communication of the ports with the chamber during a given cycle of operation of the engine. The temperature responsive means causes a greater portion of the flow to the chamber to pass through the sub-intake passage at low temperatures to minimize the likelihood of fuel condensation.

Another feature of the invention is also adapted to be embodied in an internal combustion engine of the type having a chamber of variable volume in which combustion occurs. In connection with this feature a main intake passage terminating in a main intake port is provided for delivering the charge to the chamber. Heating means are provided for heating a localized portion of the main intake passage for heating the charge flowing therethrough. A sub-intake passage is also provided that communicates with the chamber through a sub-intake port for delivering a charge therethrough. The effective cross-sectional area of the sub-intake port is substantially less than the effective cross-sectional area of the main intake port whereby a charge entering the chamber through the sub-intake port passes at a higher velocity than the corresponding charge through the main intake port. In connection with this feature of the invention the sub-intake passage has its inlet disposed in the heated portion of the main intake passage for heating the charge delivered to the chamber through the sub-intake passage.

DETAILED DESCRIPTION OF THE PREFERRED EMBODIMENTS

Figure 1:
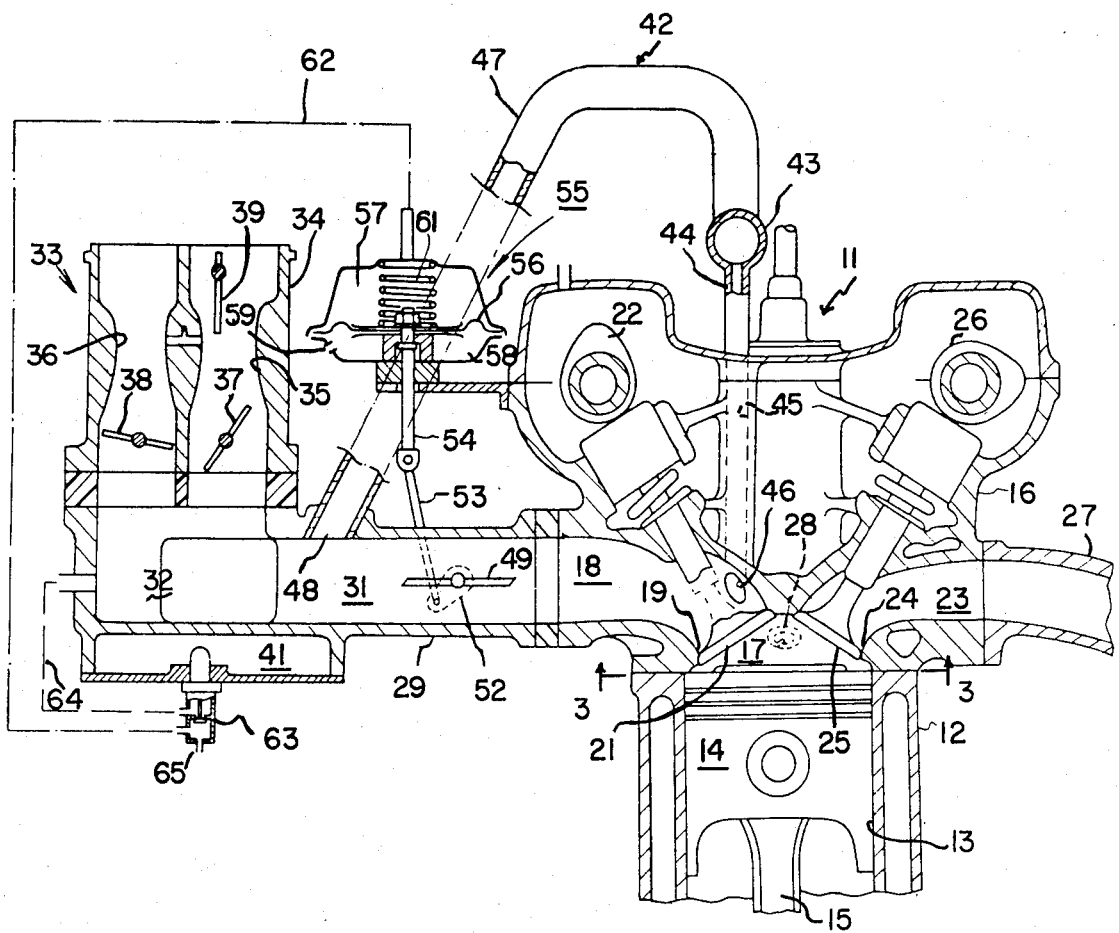
FIG. 1 is a longitudinal cross-sectional view, taken generally along the line 1—1 of FIG. 2, showing an internal combustion engine having a first embodiment of the invention.
Figure 2:
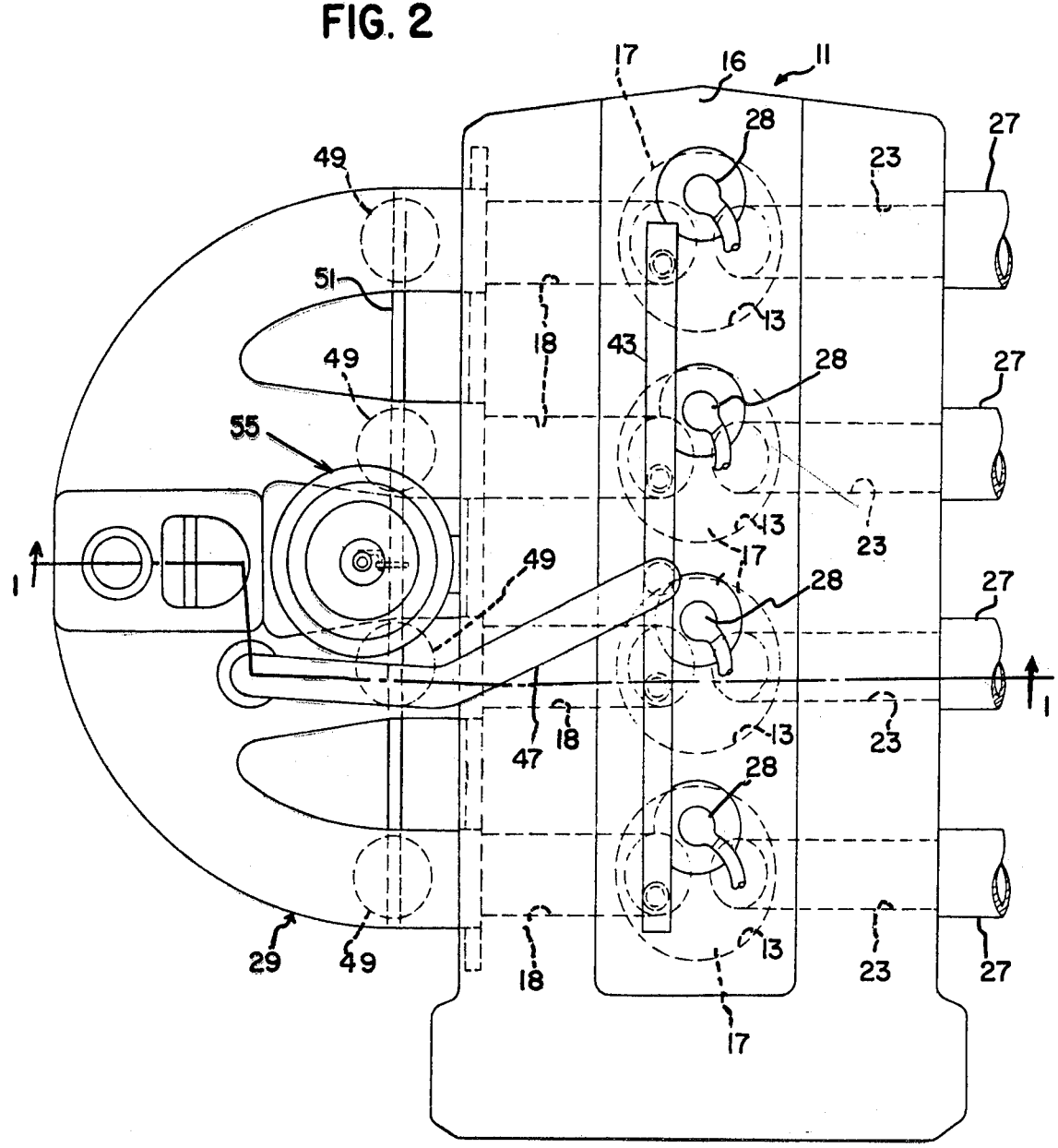
FIG. 2 is a top plan view of the engine shown in FIG. 1.
Figure 3:
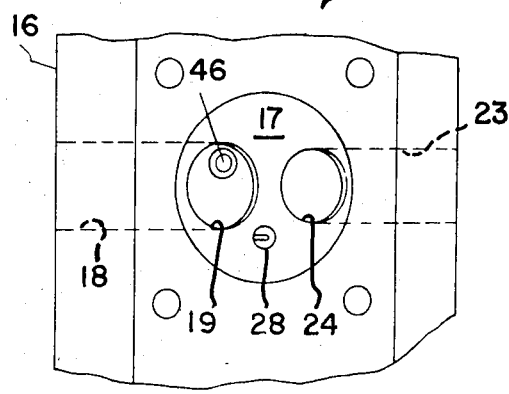
FIG. 3 is a cross-sectional view taken along the line 3—3 of FIG. 1.

Embodiment of FIGS. 1–3

An internal combustion engine constructed in accordance with a first embodiment of this invention is identified generally by the reference numeral 11. The engine 11 includes a cylinder block 12 in which a plurality of cylinder bores 13 are formed. Pistons 14 are reciprocally supported in the cylinder bores 13 and are connected by means of connecting rods 15 to a crank shaft (not shown) in a known manner.

A cylinder head 16 is affixed to the cylinder block 12 and defines with the cylinder bores 13 and pistons 14 a number of combustion chambers 17. The combustion chambers 17 are served by respective intake passages 18 which terminate in intake ports 19. Intake valves 21 cooperate with the main intake ports 19 to control the admission of a charge to the chambers 17. An intake cam shaft 22 operates the intake valve 21 in a known manner.

An exhaust passage 23 is also formed in the cylinder head 16 for each combustion chamber 17. The exhaust passages 23 terminate in exhaust ports 24 which are controlled by exhaust valves 25. The exhaust valves 25 are operated by an exhaust cam shaft 26. An exhaust manifold 27 collects the exhaust gases from the cylinder head exhaust passages 23.

A spark plug 28 is positioned in each of the combustion chambers 17 for firing the charge at or near the end of the compression stroke. The spark plugs 28 are positioned in the cylinder head 16.

An intake manifold 29 is positioned on the intake side of the cylinder head 16 and has a plurality of main intake passages 31 each of which cooperates with the cylinder head main intake passages 18, respectively. The intake manifold 29 has an enlarged chamber 32 from which the passages 31 radiate. A carburetor 33 is supported upon the manifold 29 and discharges into the chamber 32.

The carburetor 33 is of the staged two barrel type and includes a main body 34 in which a primary barrel 35 and secondary barrel 36 are formed. A primary throttle valve 37 controls the flow through the primary barrel 35 and a secondary throttle valve 38 controls the flow through the secondary barrel 36. As is well known with this type of carburetor, the primary throttle valve 37 operates prior to the operation of the secondary throttle valve 38, with the secondary throttle valve being controlled either mechanically, automatically or a combination of both. A choke valve 39 is positioned in the primary barrel 35 for providing cold starting enrichment. The carburetor 33 is of a conventional type and, for this reason, the fuel discharge system and so forth will not be described in detail.

The intake manifold 29 is provided with a hot spot 41 which, in the illustrated embodiment, is heated by the cooling water of the engine 11. Thus, the fuel air mixture discharged from the carburetor 33 will be heated prior to introduction into the combustion chamber 17. The portion of the engine 11 thus far described is conventional and, for that reason, further description of it is believed to be unnecessary.

In accordance with this invention, a sub-intake system, indicated generally by the reference numeral 42 is provided. The sub-intake system 42, as will become apparent, is provided for introduction of the charge to the combustion chambers 17 at low temperature, low load conditions. The sub-intake system 42 is designed particularly to introduce the charge under these conditions to the combustion chamber 17 at a high velocity so as to improve flame propagation and combustion speed under these conditions. As a result of this, it is unnecessary to over richen the mixture under these running conditions and, therefore, the engine 11 enjoys good low speed, low temperature fuel economy and exhaust emission characteristics. The sub-intake system 42 includes a sub-intake manifold 43 having a plurality of branch pipes 44, there being one such pipe for each combustion chamber 17 of the engine 11. The branch pipes 44 terminate in respective cylinder head sub-intake passages 45 that extend through the cylinder head 16 and which terminate at respective sub-intake ports 46 formed in the main passages 18 contiguous to their intake port 19. As is noted in my aforenoted United States patent application Ser. No. 838,353 and in the co-pending application of Etshuhiro Tezuka et al, entitled Internal Combustion Engine, Ser. No. 884,410, filed Mar. 8, 1978 the sub-intake ports 46 are disposed at a substantially different angle from the main intake ports 19 so that a charge flowing from the sub-intake port 46 will enter the chambers 17 at a substantially different angle from the charge issuing from the main intake ports 19. Also, if desired, the angle of discharge from the sub-intake ports 46 may be chosen so as to impart a swirl to the intake charge. If desired, the angle may be chosen so as to cooperate with the head of the intake valve 21 so as to effect this swirl as disclosed in said application Ser. No. 884,410.

A charge is delivered to the sub-intake manifold 43 by a conduit 47 which has an inlet end 48 that intersects the induction passages of the intake manifold 29 in the area of the chamber 31 and specifically in direct opposition to the portion heated by the hot spot 41. It will be noted that the intake 48 is positioned above the lower wall of the intake manifold 29 so that liquid fuel will not be accumulated at the opening 48. In addition, because of its direct opposition to the hot spot 41, the charge entering the sub-intake system 42 at its inlet 48 will be heated so as to insure complete vaporization of the fuel entering this system.

The proportion of flow entering the sub-intake system 42 is controlled by auxilliary throttle valves 49 positioned in each of the intake manifold main induction passages 31. The auxilliary throttle valves 49 are all affixed to a common auxilliary throttle valve shaft 51 to rotatably support the throttle valves 49 in the respective main intake passages 31. An actuating lever 52 is affixed to the auxilliary throttle valve shaft 51 and is connected by means of a link 53 to the push rod 54 of an actuator, indicated generally by the reference numeral 55. The actuator 55 includes a flexible diaphragm 56 that divides the interior of the actuator 55 into an upper chamber 57 and a lower chamber 58. The lower chamber 58 is vented to the atmosphere by means of a port 59. The diaphragm 56 is affixed to the actuating rod 54. A coil compression spring 61 is positioned in the chamber 57 and normally urges the diaphragm 56 downwardly so that the auxilliary throttle valves 49 are urged toward their fully opened position.

The chamber 57 is adapted to be selectively communicated with the pressure in the intake manifold 29 between the auxilliary throttle valves 49 and the throttle valves 37 and 38 of the carburetor 33. A conduit, indicated schematically at 62, is provided for this purpose. The conduit 62 extends to a temperature operated control valve 63 which is positioned in heat conducting relationship with the hot spot 41. The valve 63 is also in communication with the intake manifold chamber 32 via a conduit indicated schematically at 64. The operation of the temperature responsive valve 63 is such that when the hot spot 41 is at a temperature lower than a predetermined temperature, the conduits 64 and 62 will communicate with each other so that the actuator chamber 57 will experience the pressure in the intake manifold 29 between the auxilliary or sub-throttle valves 49 and the carburetor main throttle valves 37 and 38. When the temperature is above the predetermined temperature, the chamber 57 will be exposed to atmospheric pressure by an atmospheric port 65 of the temperature responsive valve 63. Under these conditions, the spring 61 will urge the auxilliary or sub-throttle valves 49 to their fully opened position as shown in the figures.

The operation of the embodiment of FIGS. 1 through 3 will now be described. In the event the engine 11 and specifically the cooling water in the hot spot 41 is at a temperature lower than that which actuates the temperature responsive valve 63, the valve 63 will close communication of the conduit 62 with the atmospheric port 65 and place the conduit 62 in communication with the conduit 64. The actuator chamber 57 will then sense the pressure in the intake manifold 29 between the auxilliary or sub-throttle valves 49 and the carburetor throttle valves 37 and 38. During cold starting, idling or low speed operation there will be sufficient intake manifold vacuum experienced in the chambers 32 so as to cause the atmospheric pressure acting on the under side of the diaphragm 56 to urge the diaphragm 56 upwardly in opposition to the spring 61. If this manifold vacuum is sufficiently low, the auxilliary or sub-throttle valves 49 will be moved to their fully closed position. Therefore, all of the intake charge for the chambers 17 must pass through the sub-intake system 42. This charge, as has been noted, will enter the chamber 17 at a high velocity from the sub-intake ports 46 so as to increase the turbulence under these running conditions and improve flame propagation and flame speed. Therefore, smooth and efficient combustion will result. Furthermore, the charge entering the sub-intake system inlet 48 will be heated by the hot spot 41.

As the primary throttle valve 37 of the carburetor 33 is opened indicating higher load on the engine 11, the pressure in the chamber 32 will eventually reach a point where it is insufficient to hold the diaphragm 56 in its upward or distended position. The spring 61 will, therefore, urge the actuator rod 54 downwardly and rotate the auxilliary or sub-throttle valves 49 toward their open position. As this occurs, a progressively larger amount of the charge entering the chambers 17 will flow through the main intake passages 31, 18 and main intake port 19.

As the engine 11 becomes heated, eventually the temperature responsive valve 63 will move to a point wherein the actuator chamber 57 is exposed to atmospheric pressure. Under this occurrence, the auxilliary throttle valves 49 will be moved to the fully opened position as shown in the figures and substantially all of the intake charge for chamber 17 will flow through the main induction passages.

Figure 4:
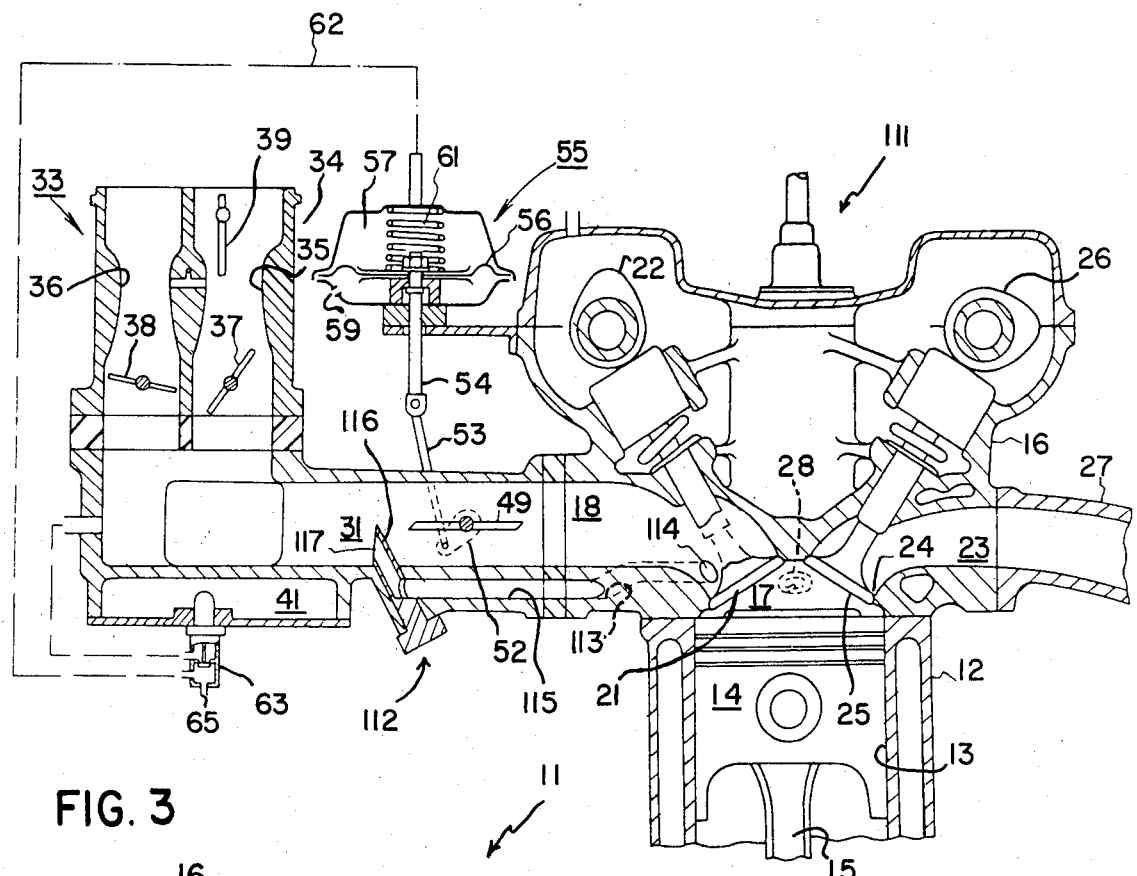
FIG. 4 is a cross-sectional view, in part similar to FIG. 1, showing another embodiment of the invention.

Embodiment of FIG. 4

An internal combustion engine constructed in accordance with another embodiment of the invention is identified in FIG. 4 by the reference numeral 111. Except for the sub-intake system, indicated in this embodiment by the reference numeral 112, the engine 111 is the same as in the previously described embodiment. For this reason, identical components which function in the same manner as the embodiments of FIGS. 1-3 have been identified by the same reference numerals and will not be described again in detail.

In connection with the embodiment of FIG. 4, the sub-intake system 112 includes a plurality of sub-intake passages 113 formed in the cylinder head adjacent the main intake passages 18 and which terminate in sub-intake ports 114. The cylinder head sub-intake passages 113 are fed by sub-intake passages 115 formed in the intake manifold and which terminate at a common intake tube 116 that extends upwardly into at least one of the intake manifold induction passages 31. The tube 116 is cut off at its forward end to provide a forwardly facing opening 117 which is positioned above the lower wall of the intake manifold and which receives a ram intake charge which has been heated by the hot spot 41. As in the previously described embodiment, the sub-intake ports 114 are disposed at a substantially different angle from the path of discharge from the main intake ports 21 so as to promote turbulence upon induction into the chamber 17. Also, as previously described, the intake from the sub-intake ports 114 may be disposed so as to impart a swirl to the intake. In all other regards the engine of the embodiment of FIG. 4 operates in the same manner as in the previously described embodiment. For this reason, the detailed description of the operation will not be repeated.

SUMMARY

Each of the described embodiments, the effective cross-sectional area of the sub-intake system is substantially less than the effective cross-sectional area of the main intake system. Normally, the effective area is determined by the size of the respective sub-intake ports and main intake ports. Because of this size difference, a given mass flow of charge issuing from the sub-intake system will enter the combustion chamber at a substantially higher velocity than the same flow of charge through the main intake system. As has been noted, this increases the turbulence in the combustion chamber and promotes smoother and more efficient combustion.

In each embodiment the charge entering the sub-intake system is drawn from a point above the bottom of the main intake system and, therefore, the likelihood of fuel condensation flowing through this sub-intake system is precluded.

This result is also obtained by placing the intake to the sub-intake systems in such a point that it will be heated by the manifold hot spot.

Although the invention has been described in conjunction with an engine having a compound or staged carburetor, it may be equally well applied to engines having single barrel carburetors, multiple carburetors, or air valve type carburetors. Various other changes and modifications may be made without departing from the spirit and scope of the invention, as defined by the appended claims.

What is claimed is:

1. In an internal combustion engine having a substantially open variable volume chamber in which combustion occurs, a charge forming device for discharging fuel, a main intake passage served by said charge forming device and communicating with said chamber through a main intake port for delivering a charge therethrough, and a sub-intake passage served by said charge forming device communicating with the open portion of said chamber through a sub-intake port, said sub-intake passage having an effective cross-sectional area at substantially less than the effective cross-sectional area of said main intake passage for causing a given mass flow of charge through said sub-intake port to enter said chamber at a significantly greater velocity, said sub-intake port being disposed in close proximity to said open chamber so that the charge delivered to said open chamber through said sub-intake passage enters said chamber at substantially undiminished velocity, the improvement comprising temperature responsive means for controlling the ratio of the communication of said ports with said chamber during a given cycle operation of said engine for causing a greater portion of the flow to said chamber to pass through said sub-intake passage at low temperatures to minimize the likelihood of fuel condensation.

2. An internal combustion engine as set forth in claim 1 wherein the temperature responsive means includes valve means for controlling the ratio of communication of said ports with said chamber during a given cycle of operation of said engine.

3. An internal combustion engine as set forth in claim 2 wherein the temperature responsive means further includes engine load responsive means for causig substantially all of the engine idle and low load charge to be supplied through the sub-intake passage at low temperatures and substantially all of the full load charge to be supplied by the main intake passage at all temperatures.

4. An internal combustion engine as set forth in claim 3 wherein the load responsive means is responsive to the pressure in at least one of said intake passages.

5. An internal combustion engine as set forth in claim 2 wherein the velve means comprise throttle valve means and sub-throttle valve means.

6. An internal combustion engine as set forth in claim 5 wherein at least one of the throttle valve means is the main intake passage.

7. An internal combustion engine as set forth in claim 6 wherein both of the throttle valve means are in the main intake passage, the sub-throttle valve means being down stream from the main throttle valve means, the inlet to said sub-intake passage being in said main intake passage between said throttle valve means, the charge forming device comprising a carburetor discharging into said main induction passage upstream of both of said throttle valve means and thereby serving both of said intake passages.

8. An internal combustion engine as set forth in claim 7 wherein the temperature responsive means further includes engine load responsive means for causing substantially all of the engine idle and low load charge to be supplied through the sub-intake passage at low temperatures and substantially all of the full load charge to be supplied by the main intake passage at all temperatures.

9. An internal combustion engine as set forth in claim 8 wherein the load responsive means is responsive to the pressure in at least one of said intake passages.

10. An internal combustion engine as set forth in claim 9 wherein the pressure sensed by the load responsive means is sensed between the throttle valve means.

11. An internal combustion engine as set forth in claim 10 wherein the load responsive means comprises a vacuum actuator operatively connected to the sub-throttle valve means, the temperature responsive means comprising a temperature responsive switch for selectively communicating said vacuum actuator with atmospheric pressure when the temperature is above the low temperature and with the main intake passage between said throttle valve means when the temperature is at or below said low temperature.

12. An internal combustion engine as set forth in claims 1, 4 and 10 wherein the sub-intake port discharges into the chamber at a substantially different angle from the main intake port.

13. An internal combustion engine as set forth in claims 1, 4 or 10 further including means for heating a portion of the main intake passage down stream of the charge forming device for improving fuel vaporization, the sub-intake passage having its inlet formed in said main intake passage at a point contiguous to said heating means.

14. An internal combustion engine as set forth in claims 1, 4 or 10 wherein the sub-intake passage has its inlet disposed in the main intake passage down stream of the point of discharge of the charge forming device for receiving its charge from said charge forming device, said sub-intake passage inlet being disposed in the path of flow through said main intake passage for generating a ram effect on the charge entering said sub-intake passage.

15. In combination with an internal combustion engine of the type having a substantially open chamber of variable volume in which combustion occurs, a main intake passage terminating in a main intake port in communication with the open portion of said chamber for delivering a charge to said chamber, heating means for heating a localized portion of said main intake passage for heating the charge flowing therethrough, a sub-intake passage communicating with the open portion of said chamber through a sub-intake port for delivering a charge thereto, said sub-intake passage having an effective cross-sectional area substantially less than the effective cross-sectional area of said main intake passage for causing a given mass flow of charge through said sub-intake port to enter said chamber at a significantly greater velocity, the improvement comprising said sub-intake passage having an inlet disposed in the heated portion of said main intake passage and receiving the heated charge therefrom for heating the charge delivered to said chamber through said sub-intake passage.

16. An internal combustion engine as set forth in claim 15 further including a charge forming device for driving a fuel air charge to the main induction passage upstream of the heating means.

17. An internal combustion engine as set forth in claim 15 further including throttle valve means for controlling the ratio of communication of the port at the chamber during a given cycle of operation of said engine.

18. An internal combustion engine as set forth in claim 17 wherein the throttle valve means comprises a main throttle valve for controlling the flow through the main intake passage and a sub-throttle valve controlling the flow through the sub-intake passage.

19. An internal combustion engine as set forth in claim 18 wherein the sub-throttle valve is positioned in the main induction passage down stream of the inlet to the sub-intake passage for diverting flow from the main intake passage into said sub-intake passage when said sub-throttle valve is closed.

20. An internal combustion engine as set forth in claim 17 or 19 further including temperature responsive means for controlling the throttle valve means, said temperature responsive means being responsive to the temperature of heating means for effecting a greater proportion of flow through the sub-intake passage when said heating means is at a temperature low than a predetermined temperature.

21. An internal combustion engine as set forth in claim 20 wherein the temperature responsive means further includes engine load responsive means for causing substantially all of the engine idle and low load charge to be supplied through the sub-intake passage at low temperatures and substantially all of the full load charge to be supplied by the main intake passage at all temperatures.

22. An internal combustion engine as set forth in claim 16 wherein the heating means comprises a hot spot in the main intake passage.

23. An internal combustion engine as set forth in claim 22 wherein the sub-intake passage inlet is disposed in opposition to the hot spot.

24. An internal combustion engine as set forth in claim 16 wherein the sub-intake passage has its inlet disposed in the main intake passage down stream of the point of discharge of the charge forming device for receiving its charge from said charge forming device, said sub-intake passage inlet being disposed in the path of flow through said main intake passage for generating a ram effect on the charge entering said sub-intake passage.

* * * * *